Dec. 10, 1963 W. O. DISMUKE 3,113,902
APPARATUS FOR VULCANIZING ORNAMENTAL TRIM ON TIRE WALLS
Filed May 17, 1962 2 Sheets-Sheet 1
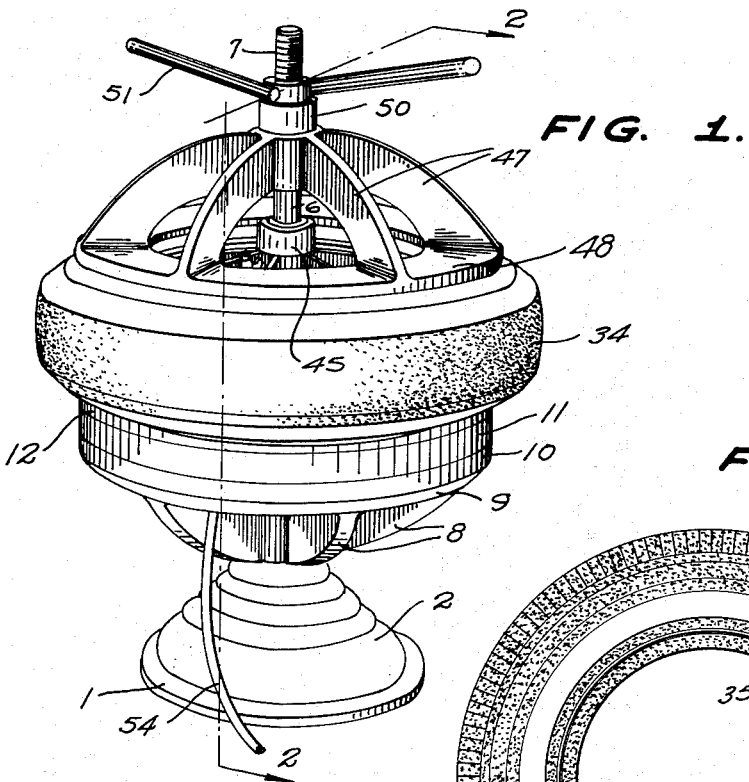
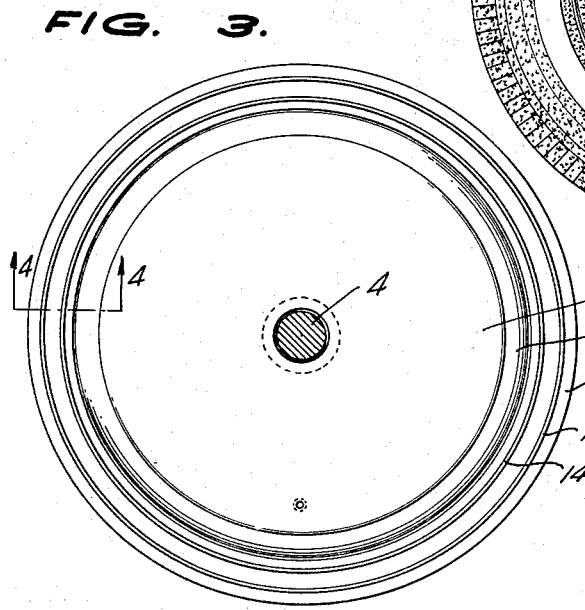
INVENTOR.
WILLIAM O. DISMUKE,
BY
ATTORNEYS.

Dec. 10, 1963 W. O. DISMUKE 3,113,902
APPARATUS FOR VULCANIZING ORNAMENTAL TRIM ON TIRE WALLS
Filed May 17, 1962 2 Sheets-Sheet 2
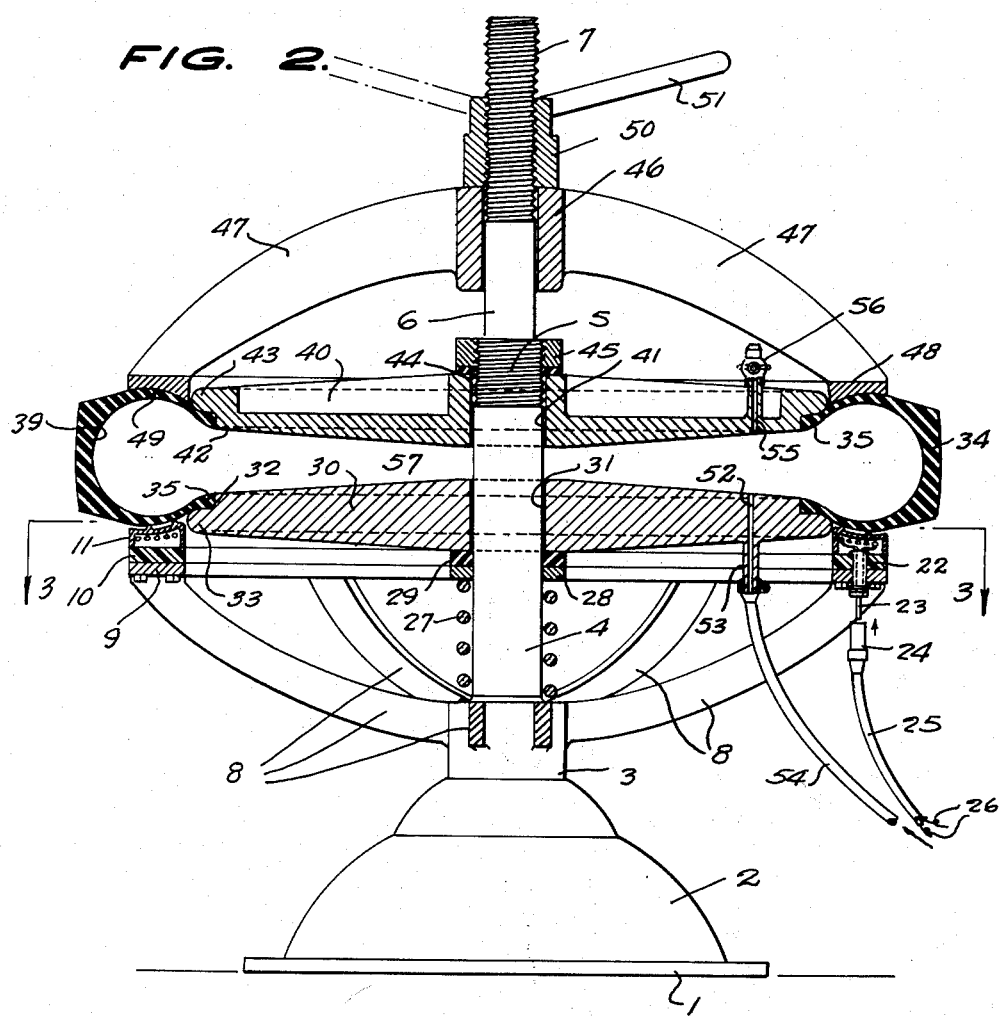
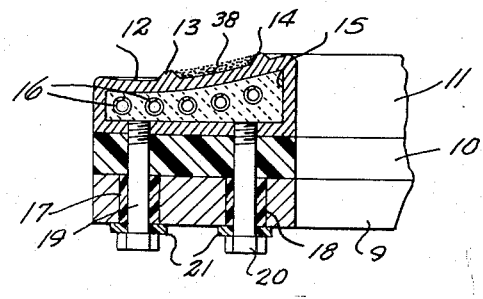
INVENTOR.
WILLIAM O. DISMUKE,
BY
Linton and Linton
ATTORNEYS.

United States Patent Office 3,113,902
Patented Dec. 10, 1963

3,113,902
APPARATUS FOR VULCANIZING ORNAMENTAL TRIM ON TIRE WALLS
William Odell Dismuke, Clarksdale, Miss., assignor to P & D Corporation, Clarksdale, Miss.
Filed May 17, 1962, Ser. No. 195,617
6 Claims. (Cl. 156—416)

The present invention relates to apparatus for the application of white sidewalls to tires and is more particularly concerned with the applying of white or colored sidewalls to tires previously having black rubber sidewalls.

The principal object of the invention is to provide an apparatus that can be quickly and easily operated by unskilled workers for applying a white or colored circular strip to the sidewalls of tires providing a white or colored sidewall to the tires without the necessity of having an inner tube and/or rim mounted on the tire.

A further important object of the invention is to provide an apparatus for vulcanizing a white or colored sidewall forming strip upon tires previously having a black rubber sidewall, which apparatus assures the proper placement of the strip for such application, permits a speedier application of the strip in the apparatus, eliminates the use of cement or adhesives in applying the strip to the tire and permits a quicker and easier changing of tires on the apparatus than in known devices.

Further objects of the invention will be in part obvious and in part pointed out in the following detailed description of the accompanying drawings, in which:

FIGURE 1 is a perspective view of the present apparatus.

FIGURE 2 is an enlarged vertical cross-sectional view of the apparatus.

FIGURE 3 is a cross-sectional view taken on line 3—3 of FIGURE 2.

FIGURE 4 is a further enlarged detailed cross-sectional view taken on line 4—4 of FIGURE 3; and FIGURE 5 is a side elevation of a tire with the present white sidewall thereon.

Referring now more particularly to the accompanying drawings in which like and corresponding parts are designated by similar reference characters, numeral 1 refers to an annular base plate having a bell shaped support 2 mounted thereon. A hub 3 is mounted on the top of said support while a shaft 4 extends axially of said hub. Plate 1, support 2, hub 3 and shaft 4 are fixedly connected as an integral unit. Further shaft 4 has a threaded end 5 and an axially extending extension 6 of reduced diameter which also has a threaded end 7.

A series of curved arms 8 are fixedly connected at their lower ends to hub 3 and extend radially and upwardly therefrom. A flat ring 9 is fixedly mounted on the upper ends of said arms, while a flat insulating ring 10 is superimposed on ring 9. Said ring 10 may be of any suitable known insulating material while Formica has been found especially suitable for this ring.

A heating ring 11 is superimposed on ring 10 and has a curved upper face 12 shaped to conform to the sidewall of a tire 34 laying thereon, while a pair of parallel annular beads 13 and 14 extend upwardly from face 12. Said beads 13 and 14 are spaced apart a sufficient distance to receive a white sidewall forming strip 38 therebetween and therearound.

Heating ring 11 has a hollow center provided by cavity 15 in which extend a series of electrical resistance heating elements 16.

Ring 9 has a plurality of insulating tubes 17 and 18 extending therethrough while a plurality of bolts 19 and 20 respectively extend through said tubes through ring 10 and are in threaded engagement with ring 11 retaining said rings together. Insulating washers 21 also have said bolts extending therethrough insulating said bolts from ring 10.

A male electrical connector 22 also extends through rings 9, 10 and 11 and is connected to said heating elements 16 and has prongs 23 extending therefrom. A plug 24 connected to cable 24 and having wires 26 for connection to a source of electrical current, is capable of attachment to connector 22 for completing a circuit to said heating elements for heating the same to vulcanizing temperatures.

Shaft 4 is encircled at its lower end by a coil spring 27 abutting hub 3 at one end and a ring 28 at its upper end. An insulating washer 29 is superimposed on ring 28, while a disc 30 is mounted on washer 29 and has an axial bore 31 through which extends shaft 4 so that said disc can move along said shaft. The periphery 32 of said disc has a rounded flange 32 whose combined configuration is shaped to closely conform to and support an inner tire bead 35 of tire 34.

A conventional black rubber tire 34 is shown in FIGURE 5 which has in addition to inner beads 35 for normally receiving a rim (not shown), a pair of spaced apart side beads 36 and 37, to which, as will be explained hereinafter, is applied the white sidewall and the usual inner air or tube receiving chamber 39. However, it is to be appreciated that tires of different sidewall configurations including plain sidewalls can equally as well be mounted on the present apparatus and have white sidewalls applied thereto.

A second disc 40 has an axial bore 41 with shaft 4 extending therethrough permitting movement of disc 40 along said shaft. The periphery 42 of disc 40 also has an annular curved side flange 43 with said periphery 42 and flange 43 having a combined configuration for closely conforming to the other inner bead of tire 34 as shown in FIGURE 2.

An insulating washer 44 is positioned between disc 40 and a nut 45 in threaded engagement with threads 5 of shaft 4.

A hub 46 is slideably mounted on extension 6 and has a series of downwardly curved arms 47 extending radially thereof. A flat disc 48 is fixedly connected to said arms 47 at their lower ends and has a side configuration 49 for conforming to the upper side of tire 34.

A nut 50 positioned above hub 46 is in threaded engagement with threads 7 of extension 6 and has operating arms 5 extending laterally thereof.

An air tube 52 extends through disc 30 and has a projection 53 connected to tube 54 connected to a source of air under pressure (not shown).

A tube 55 extends through disc 40 and has a valve 56 for opening and closing the same.

To apply a white side wall to a tire 34 a continuous strip 38 of a rubber, elastomer or flexible plastic such as for example vinyl chloride having at least a white side is laid along and between beads 13 and 14 until a ring is provided therein whereupon the strip is severed with the opposite ends thereof abutting. The white side of the strip is laid face down on ring 11. Tire 34 is then laid on ring 11 with beads 36 and 37 abutting beads 13 and 14 and inner bead 35 laying on flange 33.

Nut 45 is rotated bringing disc 40 down with flange 43 abutting the other inner bead 35 of tire 34 whereupon discs 30 and 40 and chamber 39 of tire 34 form a closed air chamber 57 therebetween.

Nut 50 is also rotated bringing ring 48 down on the upper side of tire 34.

Valve 56 is closed and compressed air is supplied to tube 54 through tube 52 to air chamber 57 filling and expanding chamber 39 of tire 34. Electrical current is supplied wires 26 and thus heating elements 16 heating ring 11 sufficiently to cause the vulcanization of strip 38 to tire 34.

Thereupon the current is discontinued to wires 26, valve 56 is opened permitting the escape of air from chamber 57 including tire chamber 39, nuts 45 and 50 are rotated permitting the withdrawal of disc 40 and ring 48 from said tire and the tire is then removed to be replaced by a further tire and strip for the next operation.

It is to be appreciated that strip 38 may equally as well be of solid white or of any color or may be a complete ring. The term "white sidewall" as used herein is meant to include colored sidewalls as well. Also tire 34 may be any conventional tire either of the tube or tubeless type to which white sidewalls are applied.

Also instead of heating elements 16, steam can be supplied within cavity 15 for heating ring 11 to vulcanizing temperatures. For this purpose a tube connected to a source of steam can be mounted through ring 11 to cavity 15 in lieu of connector 22.

The present apparatus is capable of considerable modification and such changes thereto as come within the scope of the appended claims is deemed a part of the invention.

I claim:

1. A portable apparatus for applying a sidewall strip to tires comprising a base, a shaft fixedly mounted on said base and positioned relative thereto for extending upright from said base when in use, a coil spring encircling said shaft and having one end mounted on said base, a heating ring for supporting and vulcanizing a sidewall strip, means fixedly connected to said shaft and supporting said heating ring laterally of and concentric with said shaft, annular means capable of mounting a tire on the periphery thereof and having an axial opening for slideably receiving said shaft therethrough with said means mounted on the other end of said coil spring and the tire on said means having one sidewall abutting said heating ring and means detachably and adjustably mounted on said shaft for retaining the tire abutting said heating ring.

2. Apparatus for applying a sidewall strip to tires comprising a base, an upright shaft fixedly mounted on said base support, a pair of superposed solid discs each having an axial opening with said shaft slideably extending therethrough and each having a peripheral configuration for receiving an inner bead portion of a tire on the periphery thereof supporting the tire concentrically therewith and forming a closed air chamber with the interior of said tire, means for supplying and releasing compressed air in said air chamber for at times spacing said discs apart and expanding said tire, means adjacent to and concentric with the periphery of one of said discs capable of supporting and vulcanizing a sidewall strip to one sidewall of the tire when expanded, resilient means tending to support said one of said discs on said shaft adjacent said supporting and vulcanizing means, and a stop adjustably mounted on said shaft positioned for limiting the spacing of the other of said discs from said one of said discs.

3. Apparatus for applying a sidewall strip to tires comprising a base support, an upright shaft mounted on said base support, a pair of superposed solid discs each having an axial opening with said shaft slideably extending therethrough and each having a peripheral configuration for mating with an inner bead portion of a tire positioned concentrically of the periphery of said discs, resilient means mounted on said base tending to move one of said discs towards the other, means for supplying and releasing compressed air between said discs and into the tire for expanding the same, a heating ring fixedly connected to said shaft capable of supporting the sidewall strip and the tire thereon when expanded and vulcanizing the sidewall strip to said sidewall of the tire and an adjustable stop mounted on said shift for preventing the sliding of said other disc from said first disc.

4. Apparatus for applying a sidewall strip to tires comprising a base supported shaft having threads thereon, a pair of superposed solid discs extending laterally of and being slideably mounted on said shaft below said threads, resilient means tending to move one of said discs towards the other, a nut in threaded engagement with said shaft threads capable of retaining said second disc against movement from a given position relative to said first disc, said discs each having a peripheral configuration for mating with an inner bead portion of a tire and supporting the tire concentrically with the periphery of said discs, means for supplying and releasing compressed air between said discs for inflating and deflating the tire supported thereby, a heating ring fixedly supported from said shaft and positioned for abutting the sidewall of the tire, when inflated, adjacent the inner bead portion thereof mating with said first disc and supporting and vulcanizing a sidewall strip to said tire sidewall and means adjacent to and concentric with the periphery of said second disc and capable of retaining the other sidewall of the tire relative to said heating ring.

5. Apparatus for applying a sidewall strip to tires comprising a base supported upright shaft having threads thereon, a pair of discs having axial bores with said shaft slideably extending therethrough and each with a peripheral configuration for receiving and supporting an inner bead portion of a tire with the tire mounted on the periphery of said discs, resilient means tending to support one disc of said discs and retain the same from moving from the second of said discs, a nut in threaded engagement with said shaft threads capable of abutting and retaining the second of said disc relative to said first disc, means for supplying compressed air between said discs to interior of the tire for inflating the same, means for releasing air from between said discs and said tire, a heating ring connected to said shaft and positioned adjacent to and concentric with the periphery of said first disc, said heating ring having a side of a configuration conforming to a portion of one side of said tire adjacent the bead portion received by said first disc and capable of supporting a sidewall strip for being vulcanized to said tire side, and tire abutting means adjustably carried by said shaft for abutting and retaining the other sidewall of the tire relative to said heating ring.

6. Apparatus for applying a white sidewall to tires as claimed in claim 5 wherein said tire abutting means consists of a ring having a face conforming to the other sidewall of the tire, means slideably mounted on said shaft carrying said ring with said ring face positioned adjacent and concentric to the periphery of said second disc for abutting the tire and a nut in threaded engagement with said shaft threads positioned for moving said slideable means towards the tire and retaining the same thereon.

References Cited in the file of this patent

UNITED STATES PATENTS

| | | |
|---|---|---|
| 2,147,339 | Glynn | Feb. 14, 1939 |
| 2,475,579 | Napier | July 5, 1949 |
| 2,574,171 | Collins et al. | Nov. 6, 1951 |
| 2,746,515 | Usack | Dec. 17, 1953 |
| 2,672,651 | Smyser | Mar. 23, 1954 |
| 2,802,512 | Rouse | Aug. 13, 1957 |
| 2,835,921 | White | May 27, 1958 |
| 2,932,853 | Fike | Apr. 19, 1960 |